Patented June 24, 1924.

1,498,722

UNITED STATES PATENT OFFICE.

LEONARD H. ENGLUND AND LEO SHAPIRO, OF MINNEAPOLIS, MINNESOTA; SAID LEONARD H. ENGLUND ASSIGNOR TO SAID LEO SHAPIRO.

POISON.

No Drawing.   Application filed May 12, 1923.   Serial No. 638,658.

*To all whom it may concern:*

Be it known that we, LEONARD H. ENGLUND and LEO SHAPIRO, citizens of the United States, residing at Minneapolis, in the county of Hennepin and State of Minnesota, have invented certain new and useful Improvements in Poison; and we do hereby declare the following to be a full, clear, and exact description of the invention, such as will enable others skilled in the art to which it appertains to make and use the same.

This invention provides a highly efficient and very quick-acting poison especially serviceable for use in the destruction of rats and other pests. One of the serious objections to the use of slow-acting rat poisons is found in the fact that the rats, after eating food containing the same, will have time to get into the walls or partitions where they are not accessible and where they will decay, producing seriously objectionable odours and other bad conditions. An ideal rat poison is one that will act so quickly that death from eating thereof will result almost instantly or so quickly that the rat will not have a chance to move or at least not to move any considerable distance from the place of eating, and so that they may be gathered up and properly disposed of. This improved rat poison accomplishes this result and, moreover, it is a tasteless substance which will not be detected by the rats eating the food in which it is placed.

The improved rat poison, which is the subject of this application, is a new chemical compound produced by certain chemical reactions that take place between any water soluble cyanid, of the metals which are electro-positive to zinc, such as sodium cyanid, and a soluble zinc salt, preferably zinc chloride, and a sulphite cellulose extract or substance, when in a water solution.

While the proportions of the above ingredients may be varied, nevertheless it has been demonstrated by much experiment that the most satisfactory product can be obtained by the use of the said ingredients in substantially the following proportions: sodium cyanid 98 parts, zinc chloride $136\frac{3}{10}$ parts (by weight of absolute sodium cyanide and absolute zinc chloride), and 25 parts by weight of sulphite cellulose extract.

The above ingredients are formed into a solution with sufficient water to dissolve the same. In practice, it has been found that the best results are obtained by first dissolving the sodium cyanid in water to form what may be designated as solution No. 1; second, by dissolving the zinc chloride and sulphite cellulose extract in water to form what may be designated as solution No. 2; and third, by pouring solution No. 2 into solution No. 1, while continuously stirring to produce a gradual and thorough mixture of the two solutions.

The chemical reaction that takes place when the two solutions are commingled is very complicated and has not as yet been determined, but a precipitate is produced and this precipitate, after it has been washed free from all soluble by-products, gives as a resulting main product a highly powerful and very quick-acting poison especially suitable, as above stated, for the destruction of rats and other pests.

The sodium cyanid and zinc chloride will chemically react in the portions above given, even if more or less of either thereof is introduced into the solution, and the surplus of the one substance introduced in excess of the proportions stated will be washed out as a soluble by-product.

Experiments have shown that the most powerfully poisonous product is produced by the use of the above stated ingredients in the proportions given and that when the proportions are much varied, the results obtained are not uniform and that if too small an amount of the sulphite cellulose is used, a less rapidly acting poison will be produced.

The chemical reactions that take place in the aqueous solution do not seem to be materially affected by the temperature of the water, except that the warmer the water, the quicker will be the completion of the reactions and precipitation of the product. Advisably, the water will be used in the ordinary temperatures.

As the product produced by this invention is a new chemical composition and cannot be properly identified by any existing chemical term, it is, for further identification, hereby given the name of "alpha-cyanotoxin."

This new substance contains cyanogen, zinc and organic and inorganic ingredients derived from sulphite cellulose in certain unknown combinations. From the foregoing, it will be understood that the invention above disclosed involves both an improved product and the process of producing the same.

What we claim is:

1. A composition of matter resulting from a solution containing a water soluble inorganic cyanid, a soluble zinc salt, and sulphite cellulose.

2. A composition of matter resulting from a solution of sodium cyanid, zinc chloride, and sulphite cellulose.

3. A composition of matter resulting from a solution containing a water soluble inorganic cyanid, a soluble zinc salt, and sulphite cellulose, the said substances being in approximately the proportions of their molecular weights, and 25 parts of sulphite cellulose.

4. A composition of matter resulting from a solution of sodium cyanid, zinc chloride, and sulphite cellulose, the said substances being in approximately the proportions of 98 parts of sodium cyanid, $136\frac{3}{10}$ parts of zinc chloride, and 25 parts of sulphite cellulose.

5. The process of producing a new poisonous composition of matter which consists in forming an aqueous solution of a water soluble inorganic cyanid, a soluble zinc salt, and sulphite cellulose.

6. The process of producing a new poisonous composition of matter which consists in forming an aqueous solution of sodium cyanid, zinc chloride, and sulphite cellulose.

7. The process of producing a new poisonous composition of matter which consists in forming an aqueous solution of a water soluble inorganic cyanid, in independently forming a solution of a soluble zinc salt and a sulphite cellulose substance, and in then commingling the two solutions thus formed to cause a precipitation which results in the said new composition of matter.

In testimony whereof we affix our signatures.

LEONARD H. ENGLUND.
LEO SHAPIRO.